őket
United States Patent
Kawaoka

(10) Patent No.: US 8,736,339 B2
(45) Date of Patent: May 27, 2014

(54) CLOCK DISTRIBUTION CIRCUIT AND METHOD OF FORMING CLOCK DISTRIBUTION CIRCUIT

(75) Inventor: Shigeo Kawaoka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/603,755

(22) Filed: Sep. 5, 2012

(65) Prior Publication Data

US 2013/0099844 A1   Apr. 25, 2013

(30) Foreign Application Priority Data

Oct. 21, 2011 (JP) ................................. 2011-232120

(51) Int. Cl.
*H03K 3/00* (2006.01)

(52) U.S. Cl.
USPC ........... 327/293; 327/163; 713/401; 713/503; 375/373

(58) Field of Classification Search
CPC ......... H03L 7/0891; H03L 7/087; H03L 7/00; G06F 1/10
USPC .......................... 327/291–293, 141, 147–163; 375/373–375; 713/400–401, 500–503
See application file for complete search history.

(56) References Cited

U.S. PATENT DOCUMENTS

| | | | | |
|---|---|---|---|---|
| 5,406,590 A | * | 4/1995 | Miller et al. | ................... 375/376 |
| 6,239,633 B1 | | 5/2001 | Miyano | .......................... 327/158 |
| 6,734,740 B1 | * | 5/2004 | Green et al. | ..................... 331/25 |
| 6,737,902 B2 | * | 5/2004 | Tomsio et al. | ................. 327/293 |
| 7,809,971 B2 | * | 10/2010 | Shimobeppu | ................. 713/400 |
| 7,982,519 B2 | * | 7/2011 | Lin | ............................... 327/291 |
| 2007/0152727 A1 | * | 7/2007 | Lee et al. | ....................... 327/291 |

FOREIGN PATENT DOCUMENTS

| | | |
|---|---|---|
| JP | 2000-124795 | 4/2000 |
| JP | 2007-336003 | 12/2007 |
| JP | 2008-010607 | 1/2008 |

* cited by examiner

*Primary Examiner* — Lincoln Donovan
*Assistant Examiner* — Thomas Skibinski
(74) *Attorney, Agent, or Firm* — Fitzpatrick, Cella, Harper & Scinto

(57) ABSTRACT

This invention includes a clock tree to which clock signals are distributed, and a phase comparison circuit configured to detect the phase difference between a plurality of feedback clock signals upon receiving the plurality of feedback clock signals output from different branching points of the clock tree. The invention includes a feedback clock signal generation circuit configured to generate a variation-corrected feedback clock signal for correcting a manufacture variation in the semiconductor integrated circuit based on the phase difference detected by the phase comparison circuit. The invention includes a phase regulation circuit configured to delay the clock signal so as to reduce the phase difference between a reference clock signal and the variation-corrected feedback clock signal generated by the feedback clock signal generation circuit.

8 Claims, 6 Drawing Sheets

FIG. 3

| PHASE COMPARISON | P[2:0] | Q[1:0] | Out |
|---|---|---|---|
| A > B > C | 111 | 01 | B |
| A > C > B | 110 | 10 | C |
| B > A > C | 011 | 00 | A |
| B > C > A | 001 | 10 | C |
| C > A > B | 100 | 00 | A |

CLOCK DISTRIBUTION CIRCUIT AND METHOD OF FORMING CLOCK DISTRIBUTION CIRCUIT

BACKGROUND OF THE INVENTION

1. Field of the Invention

The present invention relates to a clock distribution circuit and a method of forming a clock distribution circuit.

2. Description of the Related Art

Recently, with miniaturization of semiconductor integrated circuits, the problem of manufacturing variations due to new factors, which need not be considered at the design stage in a conventional semiconductor process, has greatly influenced circuit design. In a process in a generation that has not advanced much in terms of miniaturization, statistical distributions of individual differences due to lots, wafers, materials, and the like, have been generally handled as variations.

In a process which has advanced in miniaturization from the 90 nm generation, consideration must be given to a case in which voltage drops and working accuracy influence the electrical characteristics of transistors and wirings in chips, as factors for variations, in addition to the above individual differences at the design stage. That is, since these factors for variations influence the accuracy of timing, it is necessary to impose the design restriction of having to take larger timing margins.

Differences in electrical characteristics, in particular, become a direct factor for deterioration in clock skew, and a timing margin, which is used for a countermeasure against variations provided for a path difference, uses many timings in a cycle span/duration in a place where the path after clock branching is long such as the I/F between blocks.

To cope with such a situation, when designing a synchronous circuit based on clocks, for example, the implementation form disclosed in Japanese Patent Laid-Open No. 2007-336003 is used as a method of regulating the phase of a terminal sequential circuit driven by clocks by using a plurality of phase regulation mechanisms such as PLLs or DLLs in a chip.

In this case, although phase regulation mechanisms such as PLLs or DLLs generally use feedback loop delays, individual designing for the terminal sequential circuits driven by clocks may lead to insufficient phase regulation.

For this reason, the technique disclosed in Japanese Patent Laid-Open No. 2007-336003 uses part of a clock path to a specific sequential circuit as a common path for feedback loop paths.

In addition, there is available an arrangement which compares the phase of a reference clock with the phases of a plurality of feedback paths output from a plurality of clock trees to regulate the delays of the respective clocks (Japanese Patent Laid-Open No. 2008-010607). There is also available an arrangement for regulating the phase control amount of DLL feedback operation using external clocks and an adder (Japanese Patent Laid-Open No. 2000-124795).

With the current tendency toward further miniaturization, however, there is a situation in which consideration must be given to the problem of variations, at the design stage, which occur in manufacturing processes of exposing mask patterns, forming thin films to form elements and wirings, polishing, and the like.

That is, even if a circuit is laid out with elements and wirings having the same structures, it becomes impossible to neglect, at the stage of design, variations, i.e., changes in shape and electrical characteristics, due to layout positions and the influences of neighboring circuits. It is difficult to accurately predict, at the design stage, the influences of variations occurring in these manufacturing processes because the variations are associated with both a systematic factor and a random factor.

According to a conventional method of forming feedback loop paths for phase regulation mechanisms such as PLLs or DLLs, when a single feedback loop path causes a timing problem due to variations in manufacturing processes, since there is no arrangement for phase regulation, faults tend to occur.

SUMMARY OF THE INVENTION

The present invention provides a technique of regulating the delay of a feedback path by using a plurality of feedback paths when a transition fault occurs in the feedback path.

A clock distribution circuit according to the present invention has the following arrangement. That is, a clock distribution circuit in a semiconductor integrated circuit including sequential circuits which operate on clock signals distributed via branching points of a clock tree, comprising: a clock tree to which clock signals are distributed; a phase comparison circuit configured to receive a plurality of feedback clock signals output from different branching points of the clock tree and detect a phase difference between a plurality of feedback clock signals and detect a phase difference between a plurality of feedback clock signals; a feedback clock signal generation circuit configured to generate a variation-corrected feedback clock signal for correcting a manufacturing variation in the semiconductor integrated circuit based on the phase difference detected by the phase comparison circuit; and a phase regulation circuit configured to delay the clock signal so as to reduce a phase difference between a reference clock signal and the variation-corrected feedback clock signal generated by the feedback clock signal generation circuit.

According to the present invention, even if a transition fault occurs in a feedback path provided on a clock tree at a high probability, it is possible to regulate the delay using other feedback paths and prevent a reduction in yield.

Further features of the present invention will become apparent from the following description of exemplary embodiments (with reference to the attached drawings).

BRIEF DESCRIPTION OF THE DRAWINGS

FIG. 3 is a view showing the operation of the feedback clock signal generation circuit according to the first embodiment;

DESCRIPTION OF THE EMBODIMENTS

The embodiments of the present invention will be described in detail below with reference to the accompanying drawings.

<First Embodiment>

The following is an embodiment configured to detect the phase differences between a plurality of feedback clock signals using a clock distribution circuit according to the present invention, especially a feedback clock signal generation circuit, and select a feedback clock signal with a character close to the central character. In this case, this selected feedback clock signal is generated as a variation-corrected feedback clock signal obtained by correcting manufacturing variations in a semiconductor integrated circuit.

Figure 1:
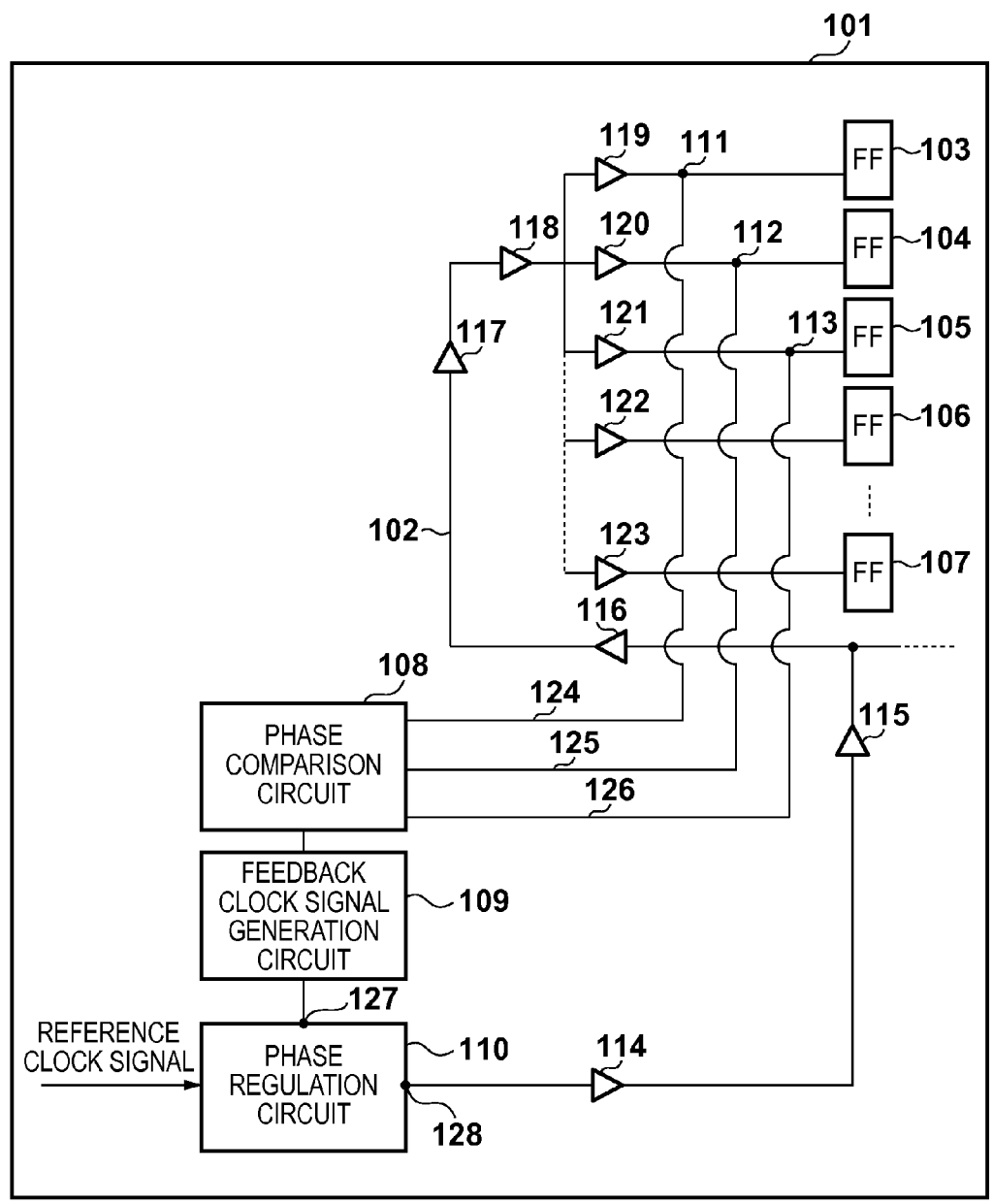
FIG. 1 is a block diagram showing an outline of the arrangement of a clock distribution circuit according to the first embodiment.

FIG. 1 is a block diagram showing the arrangement of a clock distribution circuit according to the first embodiment.

Figure 2:
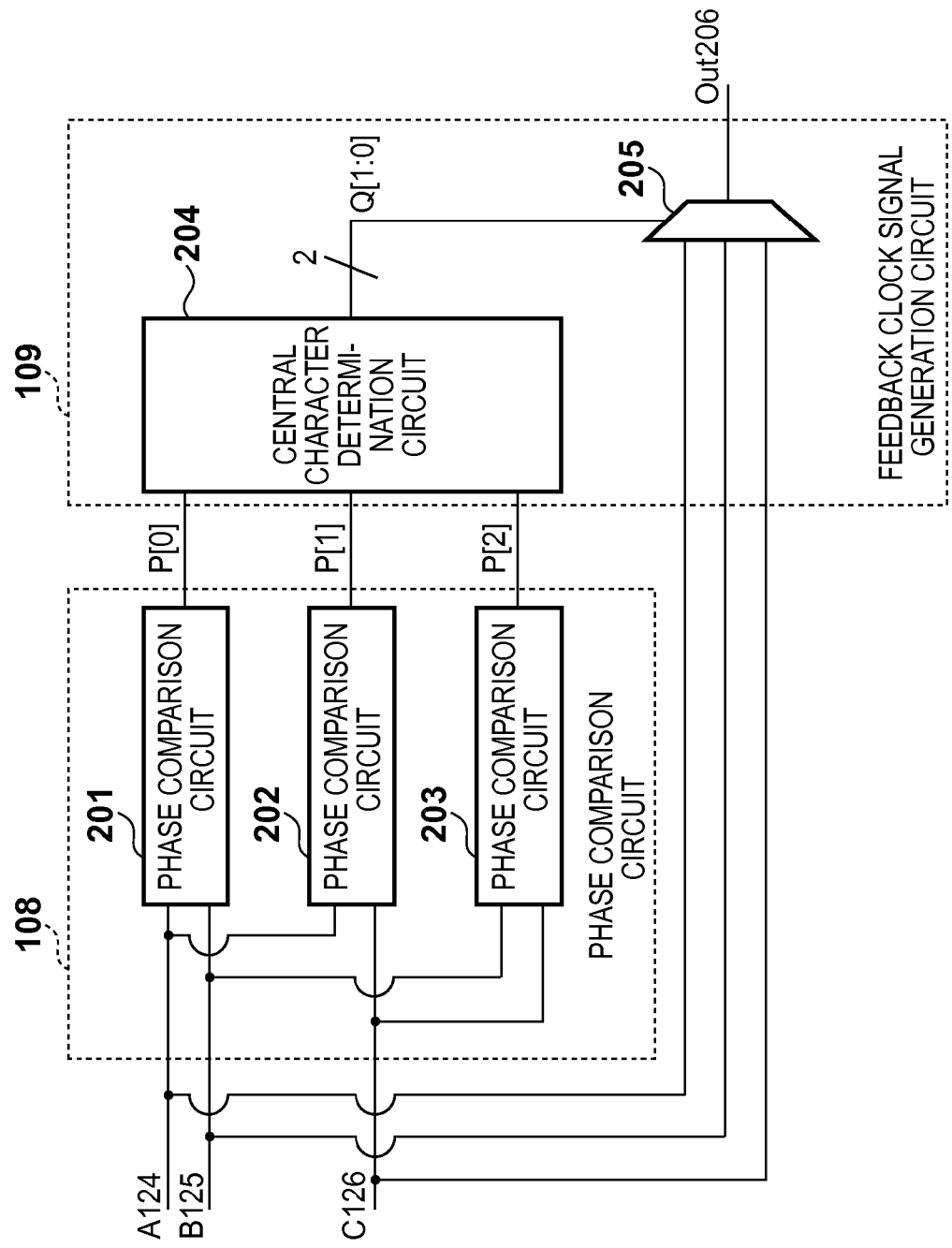
FIG. 2 is a block diagram showing the arrangement of a feedback clock signal generation circuit according to the first embodiment.

A clock distribution circuit 101 is provided in a semiconductor integrated circuit to distribute clock signals generated by using the frequencies and phases of external clock signals as reference signals to a plurality of sequential circuits 103, 104, 105, 106, and 107. The clock distribution circuit 101 includes a clock distribution signal line 102, a phase comparison circuit 108, a feedback clock signal generation circuit 109, and a phase regulation circuit 110. As shown in FIG. 2, the phase comparison circuit 108 of the first embodiment is constituted by two-input phase comparison circuits 201, 202, and 203. The feedback clock signal generation circuit 109 is constituted by a central character determination circuit 204 and a selector 205.

FIG. 3 is a truth table showing the operation of the feedback clock signal generation circuit of the first embodiment. The operation of the feedback clock signal generation circuit of the present invention will be described below with reference to FIGS. 1, 2, and 3.

The operation of the system of the first embodiment will be described below.

The phase regulation circuit 110 regulates the phase of a feedback clock signal to synchronize it with a reference clock signal, and outputs the resultant signal as a clock signal to the clock distribution signal line 102. In this case, the reference clock signal is an external clock signal to be externally supplied to the reference clock terminal of the phase regulation circuit 110. Feedback clock signals are clock signals to be supplied from feedback branching points to a feedback clock terminal 127 of the phase regulation circuit 110.

The first embodiment exemplifies branching points 111, 112, and 113 as feedback branching points. In this case, a feedback branching point may be provided near the clock terminal of a given sequential circuit of an inter-block interface.

Note that the sequential circuits 103, 104, 105, 106, and 107 may be circuits, other than flip-flops (FFs) and registers, which perform output operation in synchronism with clocks. Assume that a wiring path that is a feedback path is formed to be located near a clock wiring path extending from the starting point of a clock tree to a branching point of a feedback path.

The clock distribution signal line 102 distributes the clock signals which are output from a clock output terminal 128 of the phase regulation circuit 110 to the plurality of sequential circuits 103, 104, 105, 106, and 107. The clock distribution signal line 102 includes wirings constituting a clock tree and a plurality of clock drivers 114 to 123 provided midway along the wirings.

The phase comparison circuit 108 in FIG. 1 is connected to feedback paths and is constituted by the phase comparison circuits 201, 202, and 203 corresponding to the number of feedback paths, as shown in FIG. 2. In the first embodiment, the phase comparison circuits 201, 202, and 203 are two-input phase comparison circuits. The phase comparison circuit 201 compares the phases of feedback clock signal input to feedback paths 124 and 125. The phase comparison circuit 202 compares the phases of feedback clock signal input from the feedback path 124 and a feedback path 126. The phase comparison circuit 203 compares the phases of feedback clock signal input from the feedback paths 125 and 126. In this manner, the phase comparison circuit 108 obtains the magnitude relationship between the phases of the feedback clock signals transmitted from the feedback paths 124, 125, and 126.

The feedback clock signal generation circuit 109 in FIG. 1 is arranged between the phase comparison circuit 108 and the phase regulation circuit 110, and is constituted by the central character determination circuit 204 and the selector 205, as shown in FIG. 2. The central character determination circuit 204 selects a feedback clock signal with a character close to the central character by using the selector 205 based on the phase comparison result on the feedback clock signals transmitted from the phase comparison circuit 108, and generates a variation-corrected feedback clock signal. Subsequently, the selected feedback clock signal is transmitted from an output terminal 206 to the phase regulation circuit 110. The central character determination circuit 204 can form the logic circuit represented by the truth table in FIG. 3. The truth table in FIG. 3 is an example and may be implemented by a logic circuit represented by another truth table.

After the above processing, the phase regulation circuit 110 receives the feedback clock signal transmitted from the feedback clock signal generation circuit 109. Upon receiving the feedback clock signal, the phase regulation circuit 110 regulates the phase of a clock signal so as to synchronize it with a reference clock signal, and outputs the clock signal to the clock distribution signal line 102. In other words, the phase regulation circuit 110 delays a clock signal so as to reduce the phase difference between the reference clock signal and the feedback clock signal generated by the feedback clock signal generation circuit 109.

As described above, according to the first embodiment, it is possible to distribute a clock signal with a character close to the central character by causing the clock distribution circuit to supply a clock signal to a clock distribution line. When, therefore, variations in character occur due to the occurrence of a transition fault in a feedback path, it is possible to regulate clock delays without decreasing the yield.

<Second Embodiment>

The second embodiment will exemplify an arrangement for a case in which a feedback clock signal generation circuit detects the phase differences between a plurality of feedback clock signals, and generates a feedback clock signal with a central character (variation-corrected feedback clock signal). This embodiment differs from the first embodiment in the internal arrangements of a phase comparison circuit 108 and feedback clock signal generation circuit 109.

Figure 4:
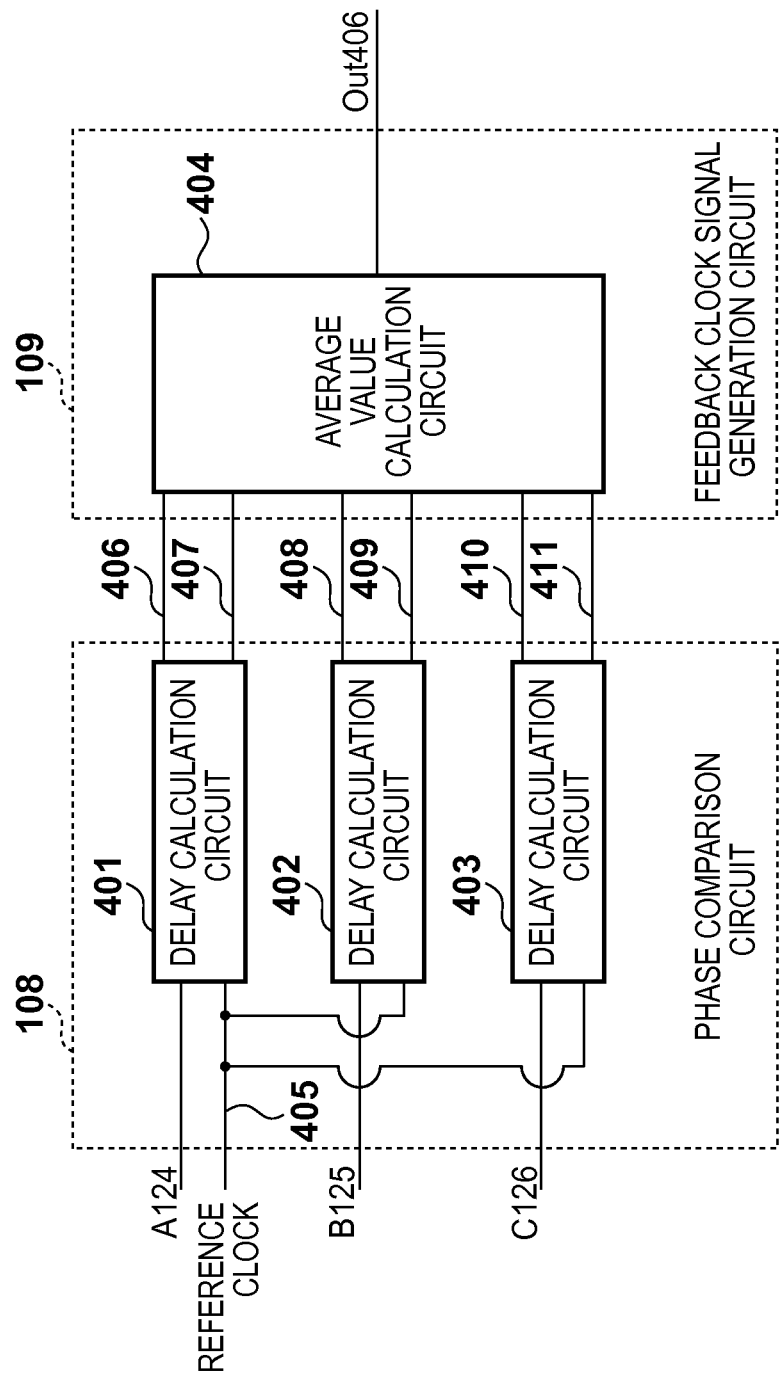
FIG. 4 is a block diagram of a feedback clock signal generation circuit according to the second embodiment.

As shown in FIG. 4, the phase comparison circuit 108 of the second embodiment is constituted by delay calculation circuits 401, 402, and 403, and the feedback clock signal generation circuit 109 is formed from an average value calculation circuit 404.

Figure 5:
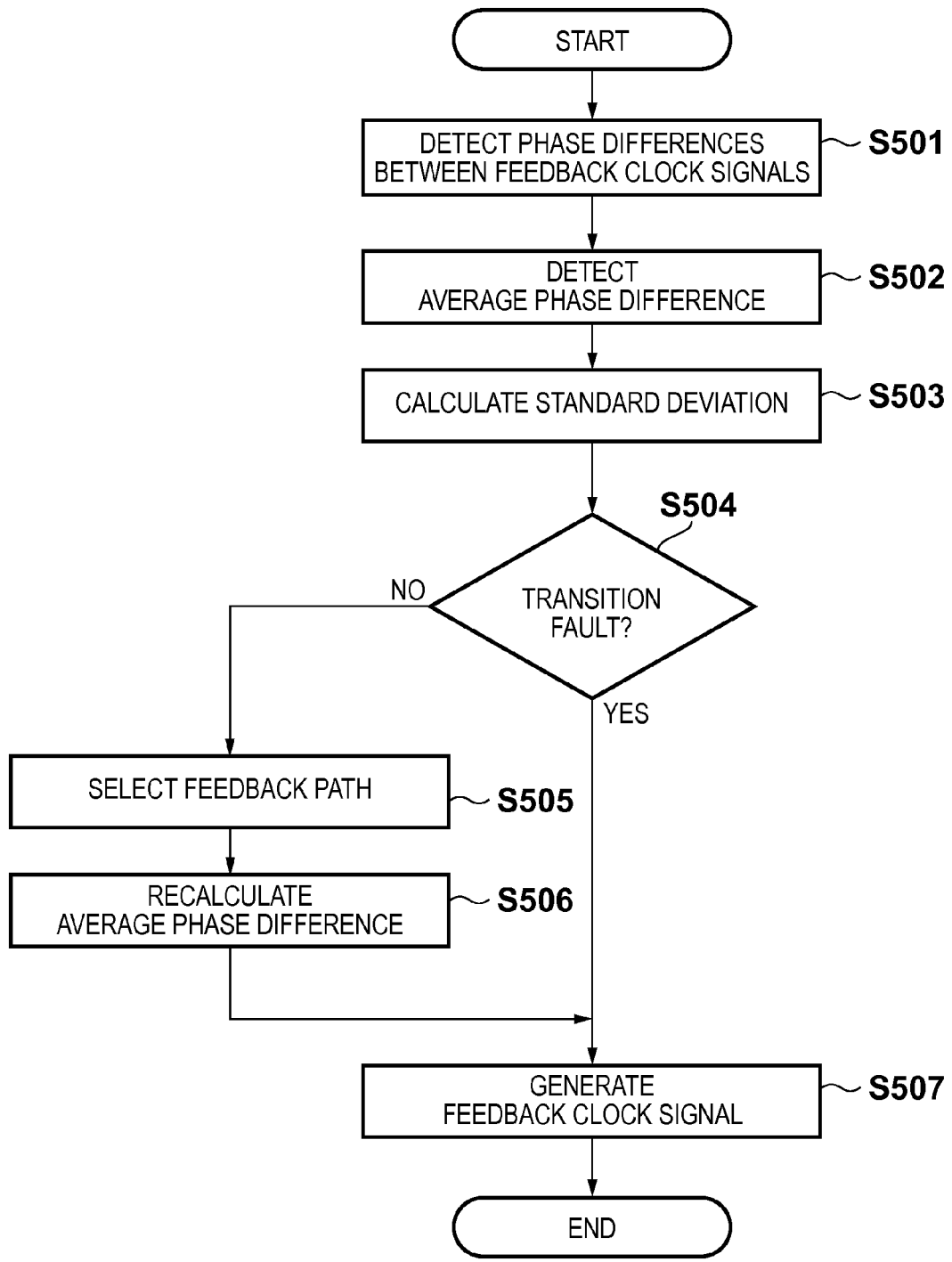
FIG. 5 is a flowchart showing the operation of the second embodiment.
Figure 6:
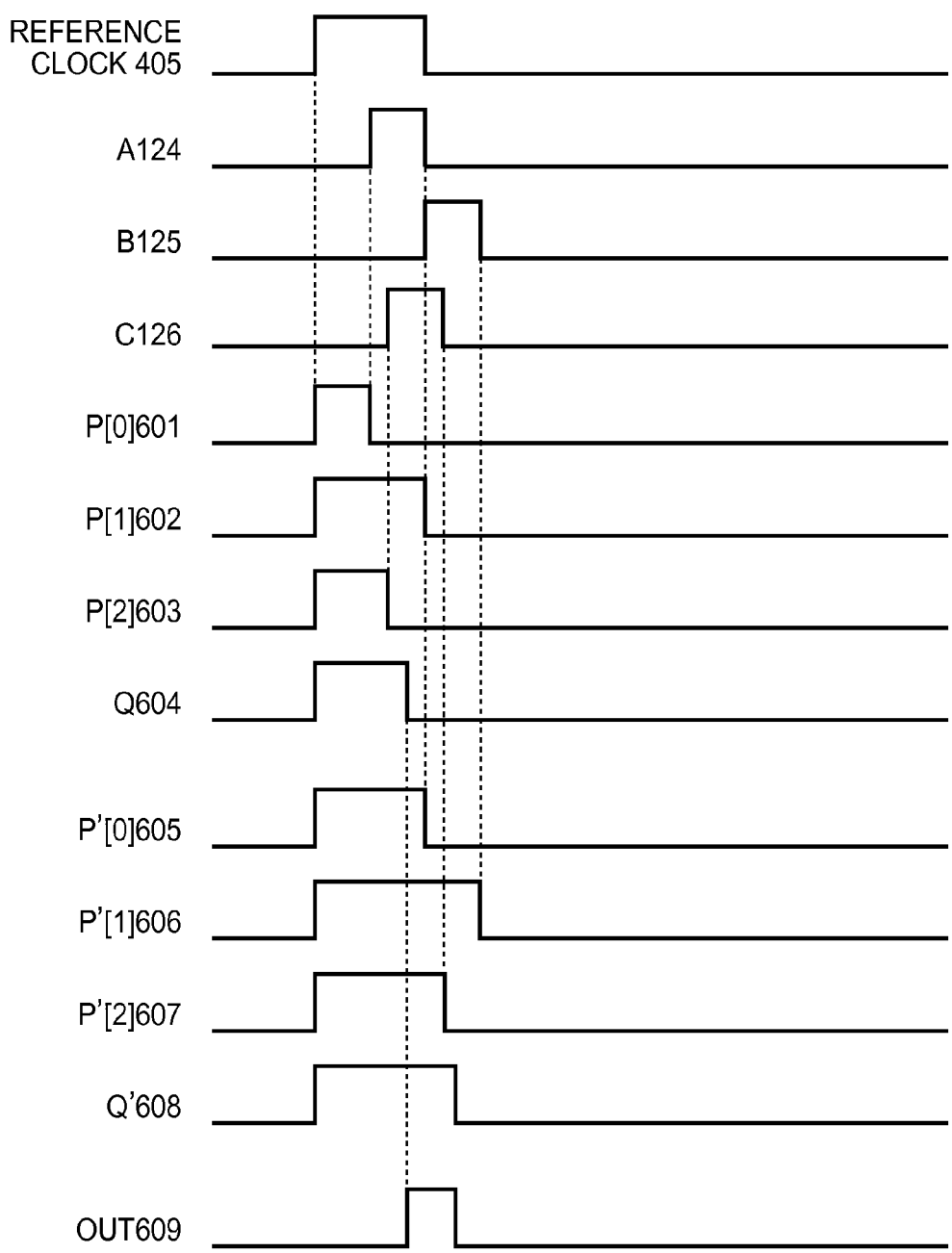
FIG. 6 is a timing chart showing the operation of a feedback clock signal generation circuit according to the second embodiment.

FIG. 5 is a flowchart showing the operation of the feedback clock signal generation circuit of the second embodiment. FIG. 6 is a timing chart showing the operation of the feedback clock signal generation circuit of the second embodiment. The operation of the feedback clock signal generation circuit of the present invention will be described with reference to FIGS. 4, 5, and 6.

In step S501, the delay calculation circuit 401 detects the delay differences (phase differences) between a reference clock 405 and the feedback clock signal input from a feedback path 124. The delay calculation circuit 401 detects delay differences at both the leading and trailing edges of each signal. Output signals 406 and 407 from the delay calculation circuit 401 respectively have waveforms 601 and 605 shown in FIG. 6. The delay calculation circuit 402 detects the delay differences between the reference clock 405 and the feedback clock signal input from the feedback path 125. Output signals 408 and 409 from the delay calculation circuit 402 respectively have waveforms 602 and 606 shown in FIG. 6. The delay calculation circuit 403 detects the delay differences between the reference clock 405 and the feedback clock signal input from the feedback path 126. Output signals 410 and 411 from the delay calculation circuit 403 respectively have waveforms 603 and 607 shown in FIG. 6.

In step S502, the average value calculation circuit 404 calculates the average values of delay differences (phase differences) between the reference clocks 405 detected by the delay calculation circuits 401, 402, and 403 and the respective feedback clock signals. The average value calculation circuit 404 calculates the average values of delay differences at both the leading and trailing edges of each clock signal. Subsequently, the average value calculation circuit 404 generates a feedback clock signal having a waveform as a central character as a variation-corrected feedback clock signal in accordance with the calculated average value of delay differences at the leading edge of each signal and the average value of delay differences at the trailing edge of each signal.

Specific operation of the average value calculation circuit 404 will be described with reference to FIG. 6. The average value calculation circuit 404 obtains the leading edge delay average value 604 from the output signal 601 from the delay calculation circuit 401, the output signal 602 from the delay calculation circuit 402, and the output signal 603 from the delay calculation circuit 403. The average value calculation circuit 404 obtains a trailing edge delay average value 608 from the output signal 605 from the delay calculation circuit 401, the output signal 606 from the delay calculation circuit 402, and the output signal 607 from the delay calculation circuit 403. Subsequently, the average value calculation circuit 404 obtains an output signal 609 by calculating the exclusive OR between a signal representing the leading edge delay average value 604 and a signal representing the trailing edge delay average value 608. The output signal 609 is input as a feedback clock signal to a phase regulation circuit 110.

Note that in this case, the apparatus may detect a feedback path in which a transition fault has occurred from the obtained delay calculation result. In step S503, the apparatus calculates the standard deviation of delay differences and compares it with an average delay value to determine whether the difference between the delay values is large (the difference is equal to or more than a predetermined value) (step S504). If the difference is equal to or more than the predetermined value (YES in step S504), in particular, the apparatus determines that a transition fault has occurred. In this case, the apparatus excludes the feedback path exhibiting the large delay from the targets for average delay value calculation and selects the remaining feedback paths (step S505). The apparatus recalculates an average delay value concerning corresponding feedback clock signals (step S506). The apparatus generates a feedback clock signal (variation-corrected feedback clock signal) in accordance with the recalculated average value of the delay differences (step S507).

The phase regulation circuit 110 regulates the phase of a clock signal so as to synchronize it with a reference clock signal after the reception of a feedback clock signal, and re-outputs the clock signal to a clock distribution signal line 102. In other words, the phase regulation circuit 110 delays the clock signal so as to reduce the phase difference between the reference clock signal and the feedback clock signal generated by the feedback clock signal generation circuit 109.

As described above, according to the second embodiment, when a transition fault occurs in a feedback path, the clock distribution circuit can regulate clock delays without decreasing the yield.

<Third Embodiment>

The following processing is executed to form the clock distribution circuit according to the first or second embodiment.

Wiring paths being as feedback paths for a plurality of feedback clock signals are arranged near clock distribution wiring paths from the starting point of a clock tree to the branching points of the feedback paths. The feedback paths for a plurality of feedback clock signals are connected to a phase comparison circuit 108. A feedback clock signal generation circuit 109 is arranged between the phase comparison circuit 108 and a phase regulation circuit 110.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-232120, filed Oct. 21, 2011, which is hereby incorporated by reference herein in its entirety.

What is claimed is:

1. A clock distribution circuit in a semiconductor integrated circuit including logical circuits which operate on clock signals distributed via branching points of a clock tree, comprising:
   a clock tree to which clock signals are distributed;
   a phase comparison circuit configured to receive a plurality of feedback clock signals output from different branching points of said clock tree and detect a phase difference between a plurality of feedback clock signals;
   a feedback clock signal generation circuit configured to generate a variation-corrected feedback clock signal for correcting a signal delay variation in the semiconductor integrated circuit based on the phase difference detected by said phase comparison circuit; and
   a phase regulation circuit configured to output the clock signal so as to reduce a phase difference between a reference clock signal and the variation-corrected feedback clock signal generated by said feedback clock signal generation circuit.

2. The circuit according to claim 1, wherein said phase comparison circuit detects a phase difference by comparing phases of the respective feedback clock signals.

3. The circuit according to claim 1, wherein said feedback clock signal generation circuit selects a feedback clock signal, from the plurality of feedback clock signals, which has a character close to a central character, based on phase differences between the plurality of feedback clock signals, and generates the feedback clock signal as the variation-corrected feedback clock signal.

4. The circuit according to claim 1, wherein said phase comparison circuit detects a phase difference between feedback clock signals by comparing a delay difference between a reference clock signal and each of the plurality of feedback clock signals.

5. The circuit according to claim 1, wherein said feedback clock signal generation circuit calculates an average delay value from a delay difference between a reference clock signal and each of the plurality of feedback clock signals, and generates a feedback clock signal having a central character as the variation-corrected feedback clock signal in accordance with the calculated average delay value.

6. The circuit according to claim 5, wherein when there is a delay difference, in delay differences between a reference clock signal and the respective feedback clock signals, which differs from the average delay value by not less than a predetermined value, said feedback clock signal generation circuit excludes the delay difference, recalculates an average delay value of the remaining delay values, and generates a feedback clock signal having a central character as the variation-corrected feedback clock signal in accordance with a recalculated average delay value.

7. The circuit according to claim 1, wherein wiring paths being as feedback paths for the plurality of feedback clock signals are arranged near wiring paths for clocks which extend from a starting point of said clock tree to branching points of the feedback paths.

8. A method of forming a clock distribution circuit according to claim 1, comprising:
- a step of arranging wiring paths as feedback paths for the plurality of feedback clock signals near wiring paths for clocks which extend from a starting point of the clock tree to branching points of the feedback paths;
- a step of connecting feedback paths for the plurality of feedback clock signals to the phase comparison circuit; and
- a step of arranging the feedback clock signal generation circuit between the phase comparison circuit and the phase regulation circuit.

* * * * *